United States Patent
Barrett et al.

(10) Patent No.: US 9,137,622 B2
(45) Date of Patent: Sep. 15, 2015

(54) ENFORCEMENT OF REGULATORY GUIDELINES ASSOCIATED WITH A DRIVE MODE OF A VEHICLE

(71) Applicant: CLOUDCAR, INC., Los Altos, CA (US)

(72) Inventors: Peter Barrett, Palo Alto, CA (US); Konstantin Othmer, Los Altos, CA (US); Bruce Leak, Los Altos hills, CA (US)

(73) Assignee: CLOUDCAR, INC., Mountain View, CA (US)

( * ) Notice: Subject to any disclaimer, the term of this patent is extended or adjusted under 35 U.S.C. 154(b) by 83 days.

(21) Appl. No.: 13/664,226

(22) Filed: Oct. 30, 2012

(65) Prior Publication Data

US 2014/0120890 A1    May 1, 2014

(51) Int. Cl.
*H04W 36/00* (2009.01)
*H04M 3/00* (2006.01)
*H04W 24/00* (2009.01)
*H04W 4/00* (2009.01)
*H04W 4/04* (2009.01)

(52) U.S. Cl.
CPC .............. *H04W 4/001* (2013.01); *H04W 4/046* (2013.01)

(58) Field of Classification Search
CPC ..... H04W 4/027; H04W 12/06; H04W 12/08; H04W 16/26; H04W 36/0072; H04W 36/32; H04W 4/028; H04W 4/22; H04W 76/068; H04W 88/04
USPC .............. 455/297, 418, 456.2, 517; 701/102, 701/293, 421, 423
See application file for complete search history.

(56) References Cited

U.S. PATENT DOCUMENTS

| | | |
|---|---|---|
| 2009/0282127 A1 | 11/2009 | Leblanc et al. |
| 2012/0244883 A1* | 9/2012 | Tibbitts et al. ............. 455/456.2 |
| 2013/0041580 A1* | 2/2013 | Petrucci et al. ............... 701/421 |
| 2013/0275023 A1* | 10/2013 | Gregg et al. .................. 701/102 |
| 2013/0303143 A1* | 11/2013 | Schrader et al. ............. 455/418 |
| 2014/0100077 A1* | 4/2014 | Ekonen et al. .................. 477/35 |
| 2014/0111126 A1* | 4/2014 | Sankaran ................. 318/400.09 |

* cited by examiner

*Primary Examiner* — Inder Mehra
(74) *Attorney, Agent, or Firm* — Maschoff Brennan

(57) ABSTRACT

In an example, a method of enforcing regulatory guidelines related to functionality of an electronic device associated with a vehicle when the vehicle is in a drive mode includes interfacing an application of an electronic device associated with a vehicle with an Application Programming Interface (API). The method additionally includes determining that the vehicle is in the drive mode. In the method, the API may modify a functionality of the application of the electronic device in accordance with regulatory guidelines associated with operation of the electronic device when the vehicle is in the drive mode. The modification may be based on the determination that the vehicle is in the drive mode.

18 Claims, 3 Drawing Sheets

ENFORCEMENT OF REGULATORY GUIDELINES ASSOCIATED WITH A DRIVE MODE OF A VEHICLE

BACKGROUND

1. Field of the Disclosure

Embodiments of the current disclosure relate to enforcement of regulatory guidelines associated with a drive mode of a vehicle.

2. Related Technology

Many consumers own mobile electronic devices (referred to as "mobile devices") with functionality that may allow the consumers to perform countless tasks and may provide the consumers with boundless information or media wherever the consumer may be. For example, mobile phones, smartphones, laptop computers, tablet computers, portable navigation systems, and personal data assistants (PDAs) are all mobile devices that are increasingly versatile and mobile.

Additionally, modern vehicles have built-in electronic devices (referred to as "vehicular devices") that provide information to the occupants of the vehicles. For example, many vehicles include navigation systems, stereo systems, video systems, mobile device interfaces, etc. that may allow occupants of the vehicles to access information and media. The vehicular devices may be original devices that come with the vehicle, or may be after-market devices. However, the use of mobile devices and/or vehicular devices while operating a vehicle can lead to operator distractions and potentially dangerous operating conditions.

In addition to providing the driver with information, the vehicular and/or mobile electronic devices may require input from the driver to perform some actions. For example, a stereo system may require the driver to interact with an interface to change the volume, change the radio station, or switch between CDs. Similarly, a mobile phone may require the driver to interact with a touchscreen or keypad to view or respond to a text message, receive a phone call, and/or access an application.

These applications and services require the driver's attention, some more than others. For example, changing the volume on a radio can be done without taking one's eyes off the road, but selecting a contact to call from a mobile phone address book often involves looking at the phone, not the road. This sort of "distracted driving" has caused accidents and many states now have laws forbidding interacting with mobile phones while driving. Additionally, the National Highway Traffic Safety Administration (NHSTA) has provided regulatory guidelines to automakers to make sure that new cars discourage distracted driving. The focus of the NHSTA regulatory guidelines is to encourage drivers to keep their eyes on the road rather than being distracted with the interface of a mobile device or vehicular device. The NHSTA regulatory guidelines are often in direct conflict with drivers' desired behavior and are often difficult to implement.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME EXAMPLE EMBODIMENTS

Some embodiments described herein generally relate to enforcing regulatory guidelines related to functionality of electronic devices associated with a vehicle when the vehicle is in a drive mode. In an example embodiment, an Application Programming Interface (API) may be configured to modify the functionality of one or more applications running on the electronic devices when the vehicle is in the drive mode. The API may modify the functionality of the applications based on the regulatory guidelines such that the applications may comply with the regulatory guidelines. In some embodiments, the API may modify the functionality based on a list of approved functionality and a list of unapproved functionality. Accordingly, the APIs may provide a framework for enabling compliance with regulatory guidelines associated with the vehicle being operated in the drive mode without having to assess whether each application complies with the regulatory guidelines or program each application to individually comply with the regulatory guidelines.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments of the present disclosure relate to the enforcement of regulatory guidelines—such as regulatory guidelines provided by the National Highway Traffic Safety Administration (NHSTA)—associated with the use of electronic devices by an operator of a vehicle when the vehicle is in a drive mode. The drive mode may be any number of modes of the vehicle that allow the vehicle to propel itself and/or in which the vehicle is moving. For example, the drive mode associated with a vehicle having an automatic transmission may be any mode of the automatic transmission other than "Park" or "Neutral" when the engine of the vehicle is running, or any mode of the automatic transmission other than "Park" when the vehicle is in motion. Additionally, the drive mode associated with a vehicle having a manual transmission or sequential gear box may be when a gear of the manual transmission or sequential gear box is engaged (i.e., not in "Neutral") when the engine of the vehicle is running. Further, the drive mode may be when the vehicle is in motion regardless of which gear of the transmission is engaged.

Different regulatory guidelines may exist relating to the functionality of the electronic devices associated with the vehicle when the vehicle is in the drive mode. Therefore, as disclosed in further detail below, in some embodiments of the present disclosure, one or more Application Programming Interfaces (APIs) may be integrated with the vehicle and/or electronic devices associated with the vehicle. The APIs may be configured to interface with one or more applications of the electronic devices to modify the functionality of the applications when the vehicle is in the drive mode to enable compliance with the regulatory guidelines. The applications may be any program of the electronic devices that may be configured to perform a functionality of the electronic devices.

In some embodiments, the APIs may utilize a list of approved and/or unapproved functionality associated with the applications of the electronic devices to enable compliance with the regulatory guidelines. The list may indicate which functions the electronic devices may perform while the vehicle is in the drive mode (referred to hereinafter as "approved functions") and/or which functions the electronic devices may not perform while the vehicle is in the drive mode (referred to hereinafter as "unapproved functions"). By modifying the functionality of the applications of the electronic devices, the APIs may provide a framework for enabling compliance with regulatory guidelines associated with the vehicle being operated in the drive mode without having to assess whether each application complies with the regulatory guidelines or program each application to individually comply with the regulatory guidelines. Alternately or additionally, the APIs may utilize a list of approved and/or unapproved applications.

Figure 1:
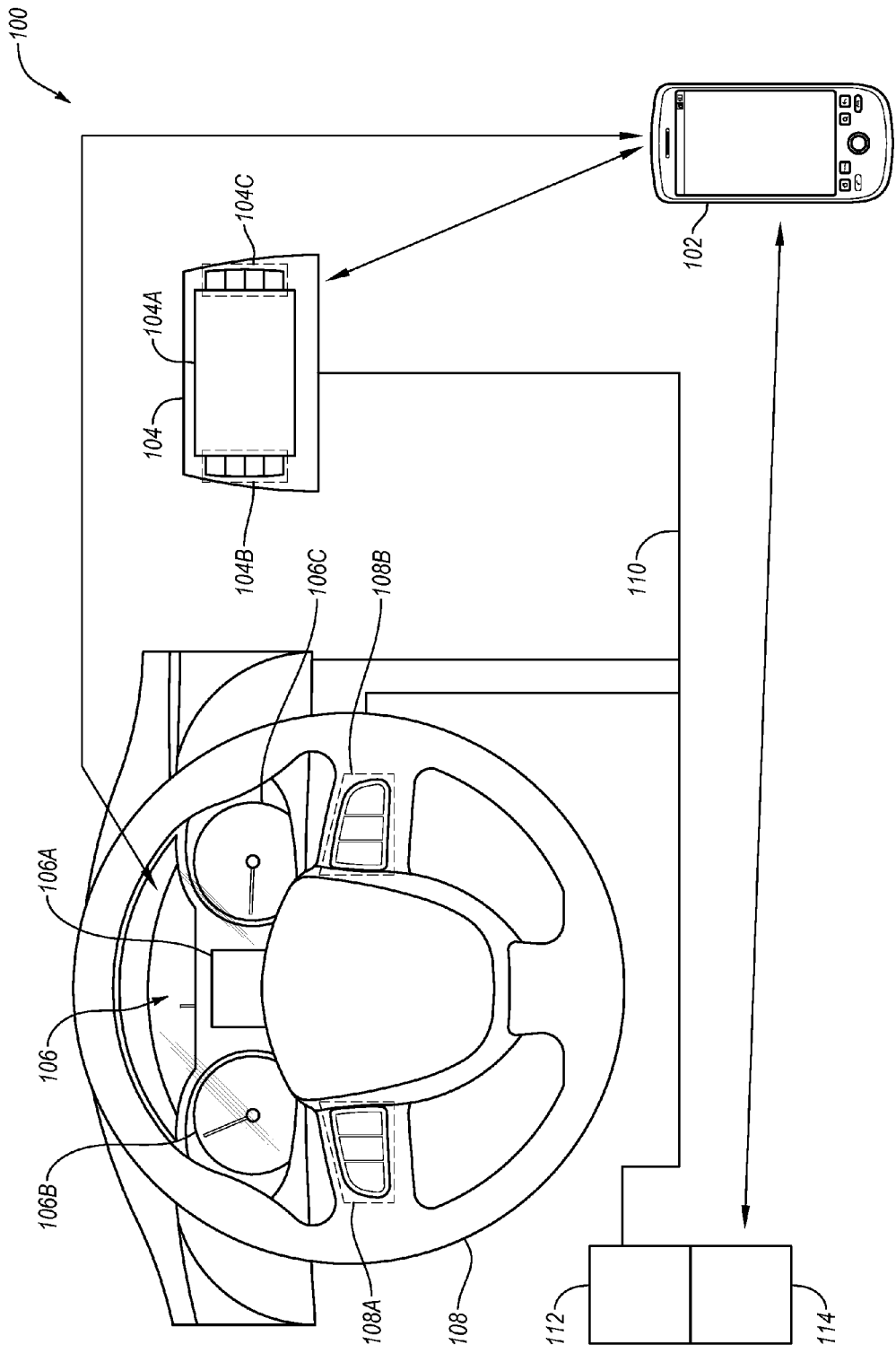
FIG. 1 illustrates an embodiment of an operating environment associated with a vehicle in which some embodiments of the present disclosure may be implemented.

FIG. 1 illustrates an embodiment of an operating environment 100 associated with a vehicle in which some embodiments of the present disclosure may be implemented. The environment 100 may include one or more electronic devices associated with the vehicle including a mobile electronic device 102 and vehicular electronic devices such as a head unit 104 and an instrument panel 106.

The mobile device 102 may be virtually any mobile device including, but not limited to, a portable media device, a personal digital assistant (PDA), a smartphone, a tablet computer, a laptop computer, a navigation system, an MP3 player or any other electronic device. According to some embodiments, the mobile device 102 may include a communication interface such as, but not limited to, an IEEE 802.11 interface, a Bluetooth interface, a Universal Mobile Telecommunications System (UMTS) interface or other mobile communication interface.

The mobile device 102 may include a UI that may include any input device configured to receive user input effective to operate the mobile device 102. For example, the UI of the mobile device 102 may include one or more buttons and/or a display of the mobile device 102 that may be implemented as a touchscreen display.

The head unit 104 may include a display 104A configured to display content such as one or more of maps, navigation instructions, video content from an integrated media player (e.g., a Digital Versatile Disk and/or BluRay player), radio or other music information, weather or traffic information, etc. The head unit 104 may additionally include a UI that may include any input device configured to receive user input effective to operate the head unit 104 and potentially other aspects of the vehicle in which the head unit 104 is installed.

For example, the UI of the head unit 104 may include one or more buttons 104B, 104C and/or the display 104A itself when implemented as a touchscreen display.

The instrument panel 106 includes at least one display area 106A in which content may be displayed. The instrument panel 106 may include one or more fixed instruments 106B, 106C. For example, the fixed instruments 106B, 106C may include a speedometer, a fuel gauge, a temperature gauge, an RPM gauge, or the like or any combination thereof. Additionally, in some embodiments, the instrument panel 106 may include a UI such as has been described with respect to the head unit 104 that may allow the user to change the content projected on the instrument panel 106.

The UIs of the mobile device 102, the head unit 104 and/or the instrument panel 106 may additionally be configured to output information, alerts, media, or the like. Accordingly, the UIs of the mobile device 102, the head unit 104 and/or the instrument panel 106 may include, but are not limited to, displays, speakers, vibrators, or other suitable output devices. Accordingly, and as described herein, restricting functionality of the electronic devices 102, 104, 106 may include restricting input and/or output functionality of the electronic devices 102, 104, 106, terminating execution of an application, or the like.

The environment 100 may further include a steering wheel 108 of the vehicle. In some embodiments, the steering wheel 108 may include a UI such as has been described above with respect to the head unit 104 that may be used to control one or more electronic devices of the vehicle. For example, the steering wheel 108 may include one or more buttons 108A, 108B. In some embodiments, the buttons 108A, 108B may be used for one or more of speaker volume control, channel selection, track selection, or for other functionality.

In some embodiments, the environment 100 may further include an intra-vehicle bus 110 to which the head unit 104, the instrument panel 106 and/or the steering wheel 108 may be communicatively coupled. The intra-vehicle bus 110 may be configured to allow processing units that may be implemented in each of a vehicular control system of the vehicle (not expressly illustrated in FIG. 1), the head unit 104, the instrument panel 106 and the steering wheel 108, among potentially others, to communicate with each other. The intra-vehicle bus may include, but is not limited to a controller area network (CAN) bus.

An access node 112 may be provided to allow access to the intra-vehicle bus 110. For example, an intra-vehicle bus interface (IVBI) device 114 may be communicatively coupled to the access node 112 to read data from and/or write data to the intra-vehicle bus 110. In an example embodiment, the access node 112 may include an on-board diagnostics (OBD) connector compliant with a particular OBD interface, such as the OBD-I, OBD-1.5, or OBD-II interfaces. Additionally, the mobile device 102 may be communicatively coupled to the IVBI device 114 via a wired or wireless connection.

In some embodiments, one or more APIs (not expressly illustrated in FIG. 1) may be configured to interface with and modify the functionality of applications associated with the head unit 104, the instrument panel 106 and/or the mobile device 102 based on whether or not the vehicle is in the drive mode and based on regulatory guidelines associated therewith. For example, the regulatory guidelines may restrict displaying images or video not related to driving, displaying automatically scrolling text, requiring manual text entry of more than a certain number of button or key presses during a single task, and/or requiring reading more than a certain number of characters of text. Examples of some tasks that may be performed by an operator and may be associated with these functions may be texting, watching a video, entering navigation information, manually looking up someone's contact information, checking social media, updating social media, etc. Accordingly, the APIs may be configured to modify the functionality of the applications such that the applications may not perform these functions, which may include entirely terminating the execution of applications in some cases.

In some embodiments, the APIs may modify the functionality of the applications based on a list of approved functions and a list of unapproved functions of the electronic devices when the vehicle is in the drive mode. For example, the unapproved functions may include the previously mentioned functions of displaying images or video not related to driving, displaying automatically scrolling text, requiring manual text entry of more than a certain number of button or key presses during a single task, and/or requiring reading more than a certain number of characters of text.

The approved functions may include functions that the regulatory guidelines indicate may be allowed and may include functions that may relate to displaying images or video related to driving, requiring limited manual text entry or button or key presses that do not exceed the proscribed threshold, etc. Examples of some tasks associated with approved functions may be adjustment of radio dials, adjustment of air conditioning or heating knobs, etc. Therefore, in some embodiments, the list of unapproved functions and list of approved functions may be based on functions that the regulatory guidelines may deem unacceptably unsafe versus those that are deemed acceptably safe.

In some embodiments the APIs may be included in the vehicular control system and may communicate instructions to modify the functionality of applications of the mobile device 102, head unit 104, instrument panel 106, and/or the steering wheel 108 via the intra-vehicle bus 110 and/or the IVBI device 114. Alternately or additionally, some or all of the APIs may be included in the mobile device 102, head unit 104, instrument panel 106, and/or the steering wheel 108. In such embodiments, the vehicular control system may be configured to communicate to the mobile device 102, head unit 104, instrument panel 106, and/or the steering wheel 108 that the vehicle is in the drive mode via the intra-vehicle bus 110 and/or the IVBI device 114. The APIs associated with the mobile device 102, head unit 104, instrument panel 106, and/or the steering wheel 108 may accordingly modify the functionality of the applications of the mobile device 102, head unit 104, instrument panel 106, and/or the steering wheel 108 based on the communication that the vehicle is in the drive mode and the regulatory guidelines associated therewith.

Additionally, in some embodiments, the mobile device 102, head unit 104, instrument panel 106, and/or the steering wheel 108 may be configured to receive a command from a user (e.g., the operator or other occupant of the vehicle) to put the mobile device 102, head unit 104, instrument panel 106, and/or the steering wheel 108 into a "driving" mode. Accordingly, APIs associated with these electronic devices may adjust the functionality of the applications of the mobile device 102, head unit 104, instrument panel 106, and/or the steering wheel 108 based on the electronic devices being placed in "driving" mode.

Therefore, the APIs may be configured to modify the functionality of applications of one or more electronic devices of the environment 100 such that the electronic devices may comply with regulatory guidelines associated with a vehicle in the drive mode. As such, the API's may provide a framework for compliance with the regulatory guidelines without having to individually program each application of the electronic devices to comply with the regulatory guidelines or verify that each application complies with the regulatory guidelines.

Modifications, additions, or omissions may be made to the environment 100 of FIG. 1 without departing from the scope of the present disclosure. For example, the number of electronic devices included in the environment 100 may vary. Additionally, the environment 100 may vary depending on the type of vehicle in which the environment 100 is included.

Figure 2:
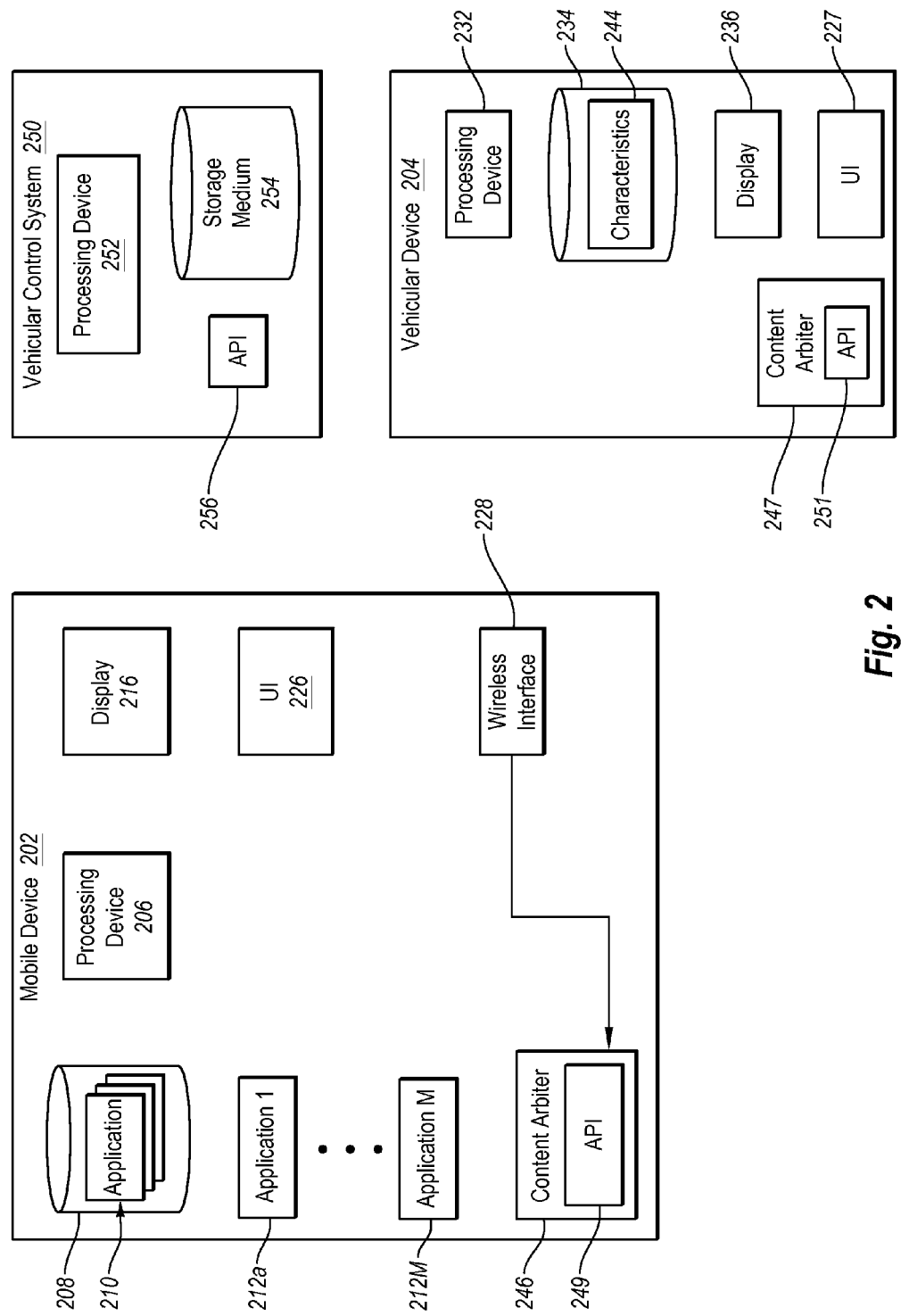
FIG. 2 is a block diagram of an example vehicular control system, mobile device and a vehicular device that may be implemented in the operating environment of FIG. 1.

FIG. 2 is a block diagram of an example vehicular control system 250, mobile device 202 and a vehicular device 204 (hereinafter device 204) that may be implemented in the operating environment 100 of FIG. 1. For example, the mobile device 202 may correspond to the mobile device 102 of FIG. 1, while the vehicular device 204 may correspond to any of the vehicular devices 104 and 106 of FIG. 1. The mobile device 202 and the vehicular device 204 are examples of electronic devices that may be associated with a vehicle.

The vehicular control system 250 may include a processing device 252 and a computer-readable storage medium 254 (hereinafter "storage medium 254"). The processing device 252 may be configured to execute instructions stored on the storage medium 254 to perform one or more of the operations described herein. For example, the storage medium 254 may include instructions associated with receiving input from one or more sensors of the vehicle and determining one or more safety parameters associated with operating the vehicle based on the received sensor input. The storage medium 254 may also include other information that may be used to determine the safety parameters; for example, map information, school zone information, laws and ordinances information, or any other information that may be used to determine the safety parameters. Alternately, such other information may be accessed by the vehicular control system 250 remotely from the mobile device 202, the vehicular device 204, or other remote device via a suitable communication interface that may be included in the vehicular control system 250.

The storage medium 254 may include, but is not limited to, a magnetic disk, a flexible disk, a hard-disk, an optical disk such as a compact disk (CD) or DVD, and a solid state drive (SSD) to name a few. Another example of a computer-readable storage medium that may be included in vehicular control system 250 may include a system memory (not shown). Various non-limiting examples of system memory include volatile memory such as random access memory (RAM) or non-volatile memory such as read only memory (ROM), flash memory, or the like or any combination thereof.

The vehicular control system 250 may be configured to determine whether the vehicle is in the drive mode and may communicate instructions to the mobile device 202 and/or the vehicular device 204 based on the determination of whether the vehicle is in the drive mode. In some embodiments, the vehicular control system 250 may communicate the instructions via an intra-vehicle bus and/or IVBI device—such as the intra-vehicle bus 212 and IVBI device 214 of FIG. 2—that may be communicatively coupled to the vehicular control system 250, mobile device 202, and vehicular device 204.

In some embodiments, the vehicular control system 250 may include an API 256 configured to interface with the applications of the mobile device 202 and/or the vehicular device 204. The API 256 may be configured to communicate control signals that may modify the functionality of one or more applications of the mobile device 202 and/or the vehicular device 204 based on the vehicle being in the drive mode and the regulatory guidelines associated therewith. As described above, in some embodiments, the API 256 may be configured to modify the functionality of the applications based on a list of approved functionality and a list of unapproved functionality, and/or based on a list of approved and/or unapproved applications. In some embodiments, the lists of approved and unapproved functionality (or applications) used by the API 256 may be stored in the storage medium 354 and accessed by the API 256.

The mobile device 202 may include a processing device 206 and a computer-readable storage medium 208 (hereinafter "storage medium 208"). The processing device 206 is configured to execute computer instructions stored on the storage medium 208 to perform one or more of the operations described herein, such as operations associated with modifying the functionality of the mobile device 202.

The storage medium 208 may be similar to the storage medium 254 and may include, but is not limited to, a magnetic disk, a flexible disk, a hard-disk, an optical disk such as a compact disk (CD) or DVD, and a solid state drive (SSD) to name a few. Another example of a computer-readable storage medium that may be included in the mobile device 202 may include a system memory (not shown).

One or more applications 210 may be stored in the storage medium 208 and executed by the processing device 206 to become corresponding instantiated applications 212a-212M that generate or render information or content locally or receive information or content from an external information or content source. The instantiated applications 212a-212M may be instantiated and/or controlled via a UI 226 of the mobile device 202. Additionally, the instantiated applications 212a-212M may be configured to output content to a built-in display 216 of the mobile device 202.

The mobile device 202 may also include a wireless interface 228 that may be configured to facilitate wireless communication of data to and from the mobile device 202. Alternately or additionally, other data, including data representing user input, commands and/or other data, may be received from and/or transmitted to corresponding external display devices by the wireless interface 228. The wireless interface 228 may include a Bluetooth wireless interface, a WiFi (or more generally, an IEEE 802.11) wireless interface, or other suitable wireless interface.

In some embodiments, the mobile device 202 may include a content arbiter 246 that may include any suitable combination of software, hardware and/or firmware. The content arbiter 246 may communicate with the vehicular control system 250 via one or more of the wireless interface 228, a wired interface, an intra-vehicle bus, an IVBI device, or any combination thereof. In some embodiments, the content arbiter 246 may receive from the vehicular control system 250, via the IVBI device, one or more instructions associated with whether or not the vehicle is in the drive mode. In some embodiments, the content arbiter 246 may include an API 249 that may interface with the applications 210 and/or instantiated applications 212a-212M of the mobile device 202. The API 249 may modify the functionality of the applications 210 and/or instantiated applications 212a-212M of the mobile device 202 according to whether or not the vehicle is in the drive mode and based on the regulatory guidelines associated therewith. Similarly to the API 256, in some embodiments, the API 249 may be configured to modify the functionality of the applications 210 and/or instantiated applications 212a-212M based on the list of approved functionality and the list of unapproved functionality. In some embodiments, the lists of approved and unapproved functionality used by the API 249 may be stored in the storage medium 208 and accessed by the API 249.

For example, one of the applications 210 and/or instantiated applications 212a-212M may be a video application associated with displaying a video. Therefore, the API 249 may modify the video application such that the video application may not display a video on the display 216 of the mobile device 202 based on the list of approved functionality and the list of unapproved functionality. Alternately or additionally, the API 249 may selectively suppress or disable certain input/output functionality of one of the applications 210 and/or instantiated applications 212a-212M of the mobile device 202 depending on whether or not the vehicle is in the drive mode, and/or may completely terminate any of the instantiated applications 212a-212M. Examples of the functionality of the applications 210 and/or instantiated applications 212a-212M of the mobile device 202 that may be selectively suppressed may include suppressing the functionality of a texting application to prevent an operator of the vehicle from sending or receiving texts while operating the vehicle.

The vehicular device 204 may generally include a processing device 232, a computer-readable storage medium 234 (hereinafter "storage medium 234"), a display 236, and a content arbiter 247. The processing device 232 may be configured to execute computer instructions stored on the storage medium 234 to perform one or more of the operations described herein such as operations associated with modifying the functionality of the vehicular device 204. The storage medium 234 may be implemented as any of the types of storage media described above with respect to the storage mediums 208 and 254.

The content arbiter 247 of the vehicular device 204 may be substantially similar to the content arbiter 246 of the mobile device 202. Accordingly, the content arbiter 247 may communicate with the vehicular control system 250 via one or more of an intra-vehicle bus, an IVBI device, a wired or wireless interface, or the like or any combination thereof. In some embodiments, similar to the content arbiter 246 of the mobile device 202, the content arbiter 247 may receive from the vehicular control system 250 one or more instructions associated with the vehicle being in the drive mode. An API 251 of the content arbiter 247 may be configured to modify the functionality of one or more applications of the vehicular device 204 based on the vehicle being in the drive mode and the regulatory guidelines associated therewith.

For example, the API 251 may modify an application of the vehicular device 204 to selectively suppress the content that is displayed on the display 236 of the vehicular device 204 based on the regulatory guidelines. As an example, the API 251 may not allow an application to display scrolling text based on the regulatory guidelines associated with restricting scrolling text. In alternative or the same embodiments, the API 251 may modify an application of the vehicular device 204 to selectively suppress or disable functionality of a UI 227 of the vehicular device 204 based on the regulatory guidelines, or to completely terminate execution of an instantiated application.

Accordingly, one or more APIs may be configured to modify the functionality of the mobile device 202 and vehicular device 204 based on the regulatory guidelines associated with the vehicle being in the drive mode. Therefore, the applications of the mobile device 202 and the vehicular device 204 may comply with the regulatory guidelines through the modifications to their functionality by the APIs.

Modifications, additions, or omissions may be made to one or more elements of FIG. 2 without departing from the scope of the present disclosure. For example, the vehicular control system 250, the mobile device 202 and/or the vehicular device 204 may include more or fewer components configured to perform various operations. Additionally, in some embodiments, the mobile device 202 may be configured to project content to the vehicular device 204 such that the display 236 of the vehicular device 204 may display content from the mobile device 202, or vice versa. Additionally, in the same or alternative embodiments, the vehicular device 204 and mobile device 202 may be configured such that the mobile device 202 may be controlled via the UI 227 of the vehicular device 204, or vice versa. Such functionality may also be modified depending on the regulatory guidelines associated with the vehicle operating in the drive mode.

Figure 3:
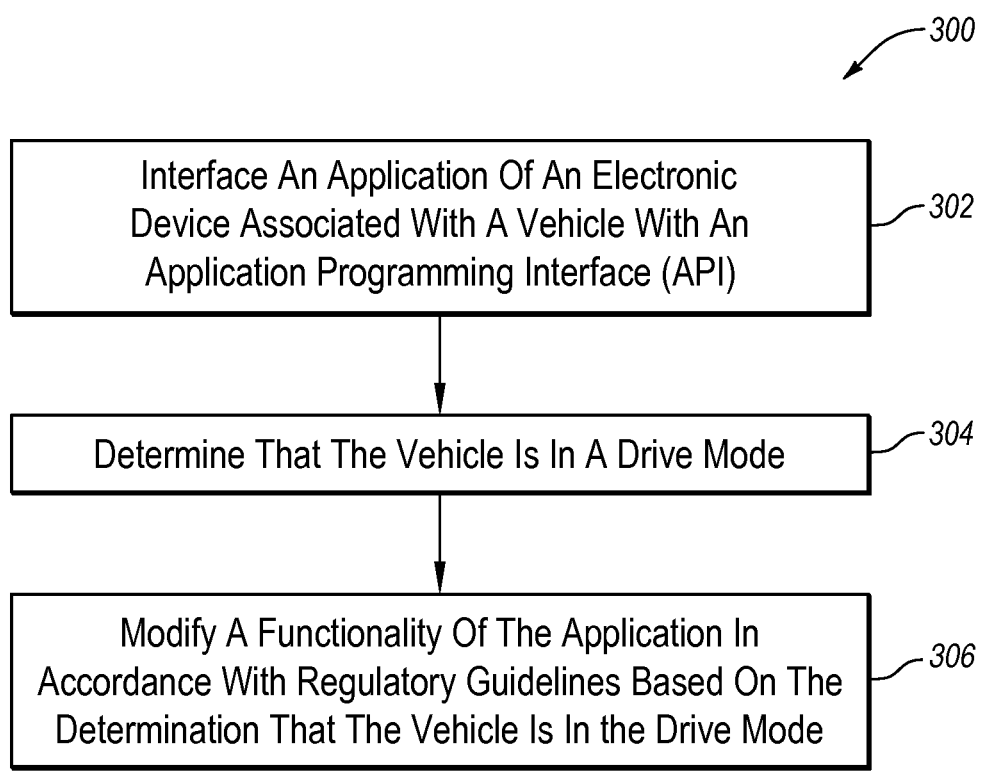
FIG. 3 is a flowchart of an example method of enforcing regulatory guidelines related to functionality of electronic devices associated with a vehicle when the vehicle is in a drive mode.

FIG. 3 is a flowchart of an example method 300 of enforcing regulatory guidelines associated with a vehicle that is in a drive mode. The method 300 and/or variations thereof may be implemented, in whole or in part, by an API such as the APIs described with respect to FIGS. 1 and 2. Alternately or additionally, the method 300 and/or variations thereof may be implemented, in whole or in part, by a processing device executing computer instructions stored on a computer-readable storage medium. Although illustrated as discrete blocks, various blocks may be divided into additional blocks, combined into fewer blocks, or eliminated, depending on the desired implementation.

The method 300 may begin at block 302 in which an application of an electronic device associated with a vehicle may be interfaced by an API. At block 304, a determination may be made that the vehicle is in a drive mode. In some embodiments, the determination may be made by a vehicular control system of the vehicle. In the same or alternative embodiments, the determination may be made by the electronic device based on a signal communicated from the vehicular control system or an input by a user of the electronic device.

At block 306, the API may modify a functionality of the application of the electronic device in accordance with regulatory guidelines associated with operation of the electronic device when the vehicle is in the drive mode. The modification may be based on the determination that the vehicle is in the drive mode.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, the method 300 may additionally include blocks associated with generating a list of one or more approved functions of the electronic device and generating a list of one or more unapproved functions. In the same or other embodiments, the API may modify the functionality of the application based on the lists of approved and unapproved functions, and/or based on a list of approved and/or unapproved applications.

The embodiments described herein may include the use of a special purpose or general-purpose computer including various computer hardware or software modules, as discussed in greater detail below.

Embodiments within the scope of the present disclosure also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method of enforcing regulatory guidelines related to functionality of an electronic device associated with a vehicle when the vehicle is in a drive mode, the method comprising:
    interfacing an application of an electronic device associated with a vehicle with an Application Programming Interface (API);
    generating a list of one or more approved functions of the electronic device with respect to when the vehicle is in a drive mode based on regulatory guidelines associated with operation of the electronic device; and
    generating a list of one or more unapproved functions of the electronic device with respect to when the vehicle is in the drive mode based on the regulatory guidelines;
    determining that the vehicle is in a drive mode; and
    selectively modifying, via the API, a functionality of the application of the electronic device in accordance with the regulatory guidelines based on the determination that the vehicle is in the drive mode and based on the list of one or more approved functions and the list of one or more unapproved functions, wherein selectively modifying the functionality of the application includes disabling functionality of the application that is included in the list of one or more unapproved functions while maintaining functionality of the application that is included in the list of one or more approved functions.

2. The method of claim 1, wherein the one or more unapproved functions include at least one of displaying images or video not related to driving, displaying automatically scrolling text, requiring manual text entry of more than a first threshold number of button or key presses during a single task, and requiring reading more than a second threshold number of characters of text.

3. The method of claim 1, further comprising determining that the vehicle is in the drive mode based on movement of the vehicle.

4. The method of claim 1, further comprising determining that the vehicle is in the drive mode based on an input received from a user of the electronic device.

5. The method of claim 1, further comprising determining that the vehicle is in the drive mode based on a transmission of the vehicle being engaged in a gear.

6. The method of claim 1, further comprising determining that the vehicle is in the drive mode based on an engine of the vehicle running.

7. The method of claim 1, wherein the API is included in a vehicular control system of the vehicle.

8. The method of claim 1, wherein the API is included in the electronic device.

9. A processor configured to execute computer instructions to cause a system to perform operations for enforcing regulatory guidelines related to functionality of an electronic device associated with a vehicle when the vehicle is in a drive mode, the operations comprising:
   interfacing an application of an electronic device associated with a vehicle with an Application Programming Interface (API);
   determining that the vehicle is in a drive mode; and
   selectively modifying, via the API, a functionality of the application of the electronic device in accordance with regulatory guidelines associated with operation of the electronic device when the vehicle is in the drive mode based on the determination that the vehicle is in the drive mode, wherein selectively modifying the functionality of the application includes disabling functionality of the application that is unapproved according to the regulatory guidelines while maintaining functionality of the application that is approved according to the regulatory guidelines.

10. The processor of claim 9, wherein the operations further comprise:
   generating a list of one or more approved functions of the electronic device with respect to when the vehicle is in the drive mode based on the regulatory guidelines;
   generating a list of one or more unapproved functions of the electronic device with respect to when the vehicle is in the drive mode based on the regulatory guidelines;
   disabling functionality of the application according to the list of one or more unapproved functions; and
   maintaining functionality of the application according to the list of one or more approved functions.

11. The processor of claim 10, wherein the one or more unapproved functions include at least one of displaying images or video not related to driving, displaying automatically scrolling text, requiring manual text entry of more than a first threshold number of button or key presses during a single task, and requiring reading more than a second threshold number of characters of text.

12. The processor of claim 9, wherein the operations further comprise determining that the vehicle is in the drive mode based on movement of the vehicle.

13. The processor of claim 9, wherein the operations further comprise determining that the vehicle is in the drive mode based on an input received from an occupant of the vehicle.

14. The processor of claim 9, wherein the operations further comprise determining that the vehicle is in the drive mode based on a transmission of the vehicle being engaged in a gear.

15. The processor of claim 9, wherein the operations further comprise determining that the vehicle is in the drive mode based on an engine of the vehicle running.

16. The processor of claim 9, wherein the API is included in a vehicular control system of the vehicle.

17. The processor of claim 9, wherein the API is included in the electronic device.

18. A non-transitory computer-readable storage medium including instructions stored thereon that, in response to execution by one or more processors, causes a system to perform one or more operations, the operations comprising:
   interfacing an application of an electronic device associated with a vehicle with an Application Programming Interface (API);
   determining that the vehicle is in a drive mode; and
   selectively modifying, via the API, a functionality of the application of the electronic device in accordance with regulatory guidelines associated with operation of the electronic device when the vehicle is in the drive mode based on the determination that the vehicle is in the drive mode, wherein the regulatory guidelines include a threshold number of allowed button or key presses for text entry by an operator of the vehicle when the vehicle is in drive mode and wherein selectively modifying the functionality of the application includes disabling text entry functionality that violates the threshold number of allowed button or key presses operations while maintaining text entry functionality of the application that meets the threshold number of allowed button or key presses.

* * * * *